US009123239B2

(12) United States Patent
Kurzhanskiy

(10) Patent No.: US 9,123,239 B2
(45) Date of Patent: Sep. 1, 2015

(54) ESTIMATION OF HOURLY TRAFFIC FLOW PROFILES USING SPEED DATA AND ANNUAL AVERAGE DAILY TRAFFIC DATA

(71) Applicant: ITERIS, INC., Santa Ana, CA (US)

(72) Inventor: Alex A. Kurzhanskiy, Albany, CA (US)

(73) Assignee: ITERIS, INC., Santa Ana, CA (US)

( * ) Notice: Subject to any disclaimer, the term of this patent is extended or adjusted under 35 U.S.C. 154(b) by 124 days.

(21) Appl. No.: 14/159,769

(22) Filed: Jan. 21, 2014

(65) Prior Publication Data

US 2015/0206428 A1 Jul. 23, 2015

(51) Int. Cl.
*G08G 1/052* (2006.01)
*G01C 21/36* (2006.01)

(52) U.S. Cl.
CPC ..................................... *G08G 1/052* (2013.01)

(58) Field of Classification Search
CPC ........... G08G 1/00; G08G 1/052; G01C 21/36
USPC ........................... 701/117, 118, 119; 340/905
See application file for complete search history.

(56) References Cited

U.S. PATENT DOCUMENTS

| | | | | |
|---|---|---|---|---|
| 4,167,785 A * | 9/1979 | McReynolds et al. | ........ | 701/118 |
| 2011/0288756 A1* | 11/2011 | Chapman et al. | ............ | 701/118 |
| 2014/0159923 A1* | 6/2014 | Koodli et al. | ................ | 340/905 |
| 2014/0236957 A1* | 8/2014 | Rieppi | ......................... | 707/741 |

* cited by examiner

*Primary Examiner* — Tan Q Nguyen
(74) *Attorney, Agent, or Firm* — Lazaris IP

(57) ABSTRACT

A framework for performance evaluation and active management of a transportation network infrastructure reconstructs traffic flow profiles by modeling annual average daily traffic data and collected traffic speed data to estimate an hourly traffic flow profile for a roadway segment, or link. Total daily flow for a link is derived from the corresponding annual average daily traffic data for that link, and is adjusting by the day of week and the monthly seasonal factors. An hourly flow distribution profile for a roadway link is then constructed using the traffic speed data relative to that link.

27 Claims, 6 Drawing Sheets

FIG. 2
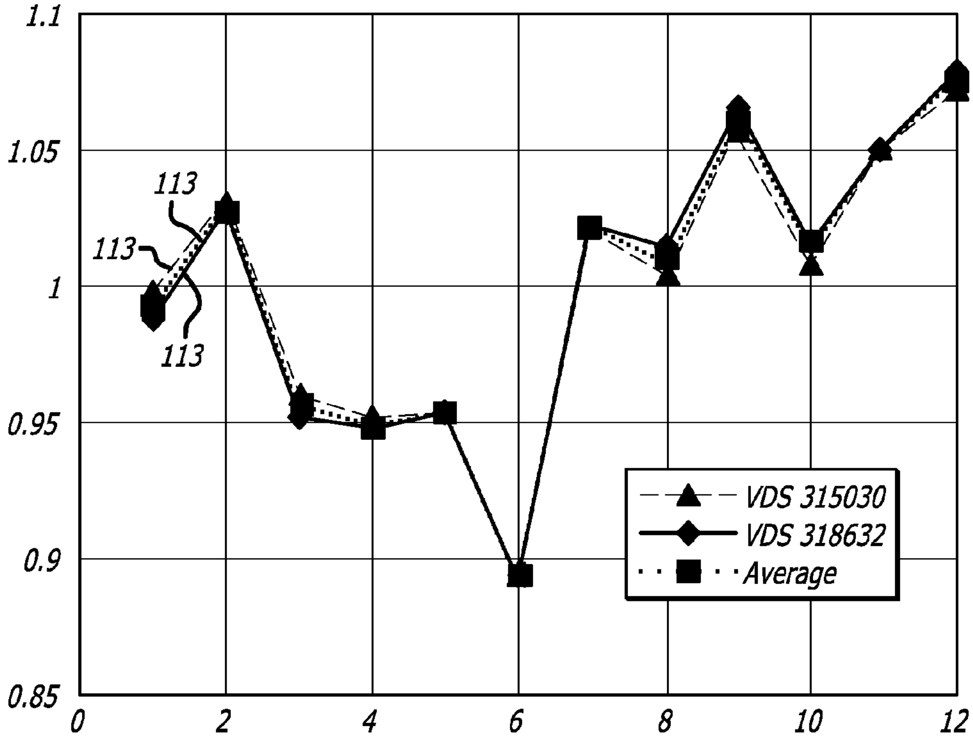
FIG. 3

ESTIMATION OF HOURLY TRAFFIC FLOW PROFILES USING SPEED DATA AND ANNUAL AVERAGE DAILY TRAFFIC DATA

FIELD OF THE INVENTION

The present invention relates to performance evaluation and active management of a transportation network infrastructure. Specifically, the present invention relates to the use of annual average daily traffic data and collected traffic speed data to reconstruct traffic flow profiles and estimate an hourly traffic flow profile.

BACKGROUND OF THE INVENTION

Traffic speed data and travel time estimates are becoming widely available from commercial vendors. However, these are not sufficient for a proper performance evaluation and active management of a transportation network infrastructure, since effective road network planning and traffic operation requires the knowledge of traffic flows. Information currently available in the market does not properly represent accurate traffic flow data.

Traffic flow can be measured from annual average daily traffic (AADT) figures, which are a measure used primarily in transportation planning and transportation engineering. AADT is the total volume of vehicle traffic of a roadway for a year, divided by 365 days, and provides a simple measurement for how busy a roadway is in terms of such volume. Each year, every state in the United States submits a Highway Performance Monitoring System (HPMS) report that contains transportation network information (roadway links, and their shapes, comprising each state's network) with assigned AADT values. HPMS links are bidirectional, and thus the AADT volume in each HPMS report is a sum of daily flows in both directions for each roadway link. In general, AADT values can be roughly divided by 2 in order to obtain daily flow for a single direction. However, determining average daily flows to describe traffic volumes on a particular day is also not enough of a sufficient measure of traffic flow.

That is because traffic volume at any given location depends on the season, day of week, and other factors such as whether the day is holiday or not, and the time of day. FIG. 2 shows the dynamics of monthly flows collected from a vehicle detector station (VDS) representing a fixed location of California's Interstate 5 for both directions, North and South. From FIG. 2, it is evident that the monthly flows are nearly equal in both directions, but this plot does not account for any of the other characteristics noted above.

Traffic speed data is derived from many different sources, such as for example from roadway sensors such as radar and video systems. Traffic speed data may also be derived from data collected from providers of Global Positioning Systems (GPS) services and the like. Data from GPS services is sold in bulk, by the number of data points per day or per month, and may be packaged in different ways. For example, GPS probe data may be in the form of "raw" or unprocessed probe data points, or in the form of processed probe data that reflects traffic speed on a roadway network. Regardless of the source, the traffic speed data derived from this collected GPS data provides an indication of traffic speed at a given point in time, but does not produce an indication of traffic flow. Therefore, more is needed for effective planning and operation of traffic in a transportation network.

Accordingly, traffic flow determinations purely from available traffic speed data or from available AADT are insufficient, by themselves, to provide an accurate indication of traffic flows and reasons for them. They are also insufficient to provide an accurate estimation of hourly traffic flows. Knowledge of both traffic flows generally, and estimates of hourly traffic flows, is very helpful in transportation network infrastructure planning management.

BRIEF SUMMARY OF THE INVENTION

It is therefore one objective of the present invention to provide a system and method of using annual average daily traffic data and traffic speed data to reconstruct traffic flow profiles. It is another objective of the present invention to estimate an hourly traffic flow profile from reconstructed traffic flow profiles derived from traffic speed data and annual average daily traffic data. It is yet another objective of the present invention to improve performance evaluation and active management of a transportation network using estimates of hourly traffic flow profiles. It is still another objective of the present invention to provide a system and method of modeling annual average daily traffic data and traffic data to compute daily traffic flow values, determine hourly flow distribution profiles, and calculate hourly traffic flow profiles, to estimate hourly traffic flow profiles for roadway segments.

The present invention is a system and method of determining the flow, in vehicles/hour, on every section of a roadway network, in each direction. This enables computation of the number of people being affected by traffic congestion, which is typically reported as roadway "delay". Speed data provided by third parties does not include volume (it only has speeds), and hence delay cannot be accurately computed. The present invention solves this problem by generating a typical value of volume for each roadway link for each time period, to produce a data set that is comprised of [freeway section ID, day of week, hour of day, typical flow or volume] components, by direction. This is accomplished by converting daily traffic flow data into a directional flow by the day of the week and the hour of the day, by computing a directional split and an hourly split by time of day extracting from the third party speed-only data which direction on the roadway is the "peak" direction and which direction has the largest flows by time of day. The present invention therefore scans for recurrent bottlenecks in the speed data and then marks those sections of roadway by time of day as having peak flow. The present invention then breaks down the flow by hour of day using typical profiles, and computes delay by combining this with reported real-time speeds.

The present invention discloses, in one embodiment, a system and method of estimating directional hourly flow profiles using Annual Average Daily Traffic (AADT) values, which are extracted from data collected by the state Departments of Transportation that is subsequently submitted to the Federal Highway Administration (FHWA) and published in HPMS reports, for locations where such data is available, and using traffic speed data that are either provided by third-party commercial vendors, or collected using one or more sensors, or both. This is accomplished by reconstructing traffic flow profiles, by deriving total daily flow for a link from the corresponding AADT value for that link in a given direction and for a given date, and adjusting the total daily flow by the day of week and the monthly seasonal factors. At the same time, a flow distribution profile for a given direction on a roadway link is constructed using the traffic speed data relative to that link, for the same location, direction, and day. An hourly traffic flow profile is then estimated by multiplying the flow distribution profile by the total daily flow value for a given link.

In one exemplary embodiment of the present invention, a method of estimating an hourly traffic flow profile for a roadway segment comprises one or more of the elements of: computing a daily traffic flow value at a location on a roadway segment, and for a specified direction at a specified date, from annual average daily traffic data, determining an hourly flow distribution profile for the location and for the specified direction at the specified date from collected traffic speed data, by 1) constructing temporal templates to detected traffic flows values, 2) developing one or more speed profiles from the collected traffic speed data, and 3) assigning a temporal template to a speed profile, and calculating hourly traffic flow profiles by multiplying the hourly flow distribution profile by the daily flow value.

In another exemplary embodiment, a system comprises one or more of the elements of: a computer-readable storage medium operably coupled to at least one computer processor and having program instructions stored therein, the computer processor being operable to execute the program instructions to perform one or more data processing functions in a plurality of modules, the plurality of modules including a data ingest module configured to ingest input data that at least includes annual average daily traffic data, detected traffic flow values, and collected traffic speed data, a daily traffic flow module configured to normalize the annual average traffic data with a monthly seasonal factor and a day of the week factor for each location on a roadway segment, for a specified direction and a specified date to formulate a daily traffic flow value, an hourly flow distribution profile module configured to assign temporal templates developed from detected traffic flow values to speed profiles representative of collected traffic speed data to determine an hourly flow distribution profile for each location, for the specified direction at the specified date, and a classification module configured to categorize the average annual daily traffic data with the collected traffic speed data to allocate the average annual daily traffic data into a time period that includes a morning peak, an afternoon peak, a Saturday period, a Sunday period, and a double peak, by multiplying the hourly flow distribution profile by the daily traffic flow value.

In yet another exemplary embodiment, a method comprises on or more of the elements of: ingesting input data that at least includes annual average daily traffic data, detected traffic flow values, and collected traffic speed data; modeling the input data to construct estimates of hourly traffic flow profiles, by normalizing the annual average traffic data with a monthly seasonal factor and a day of the week factor for each location on a roadway segment, for a specified direction and a specified date to formulate a daily traffic flow value, assigning temporal templates constructed from detected traffic flow values to speed profiles representative of collected traffic speed data to determine an hourly flow distribution profile for each location, for the specified direction at the specified date, and categorizing the average annual daily traffic data with the collected traffic speed data to allocate the average annual daily traffic data into a time period that includes a morning peak, an afternoon peak, a Saturday period, a Sunday period, and a double peak, and generating output data representative of estimations of hourly traffic flow profiles.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

FIG. 2 is a graph of monthly traffic flow volumes for a single location of California Interstate 5 for directions North and South;

FIG. 3 is a graph showing an example of monthly seasonal factors for the state of California in 2012;

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
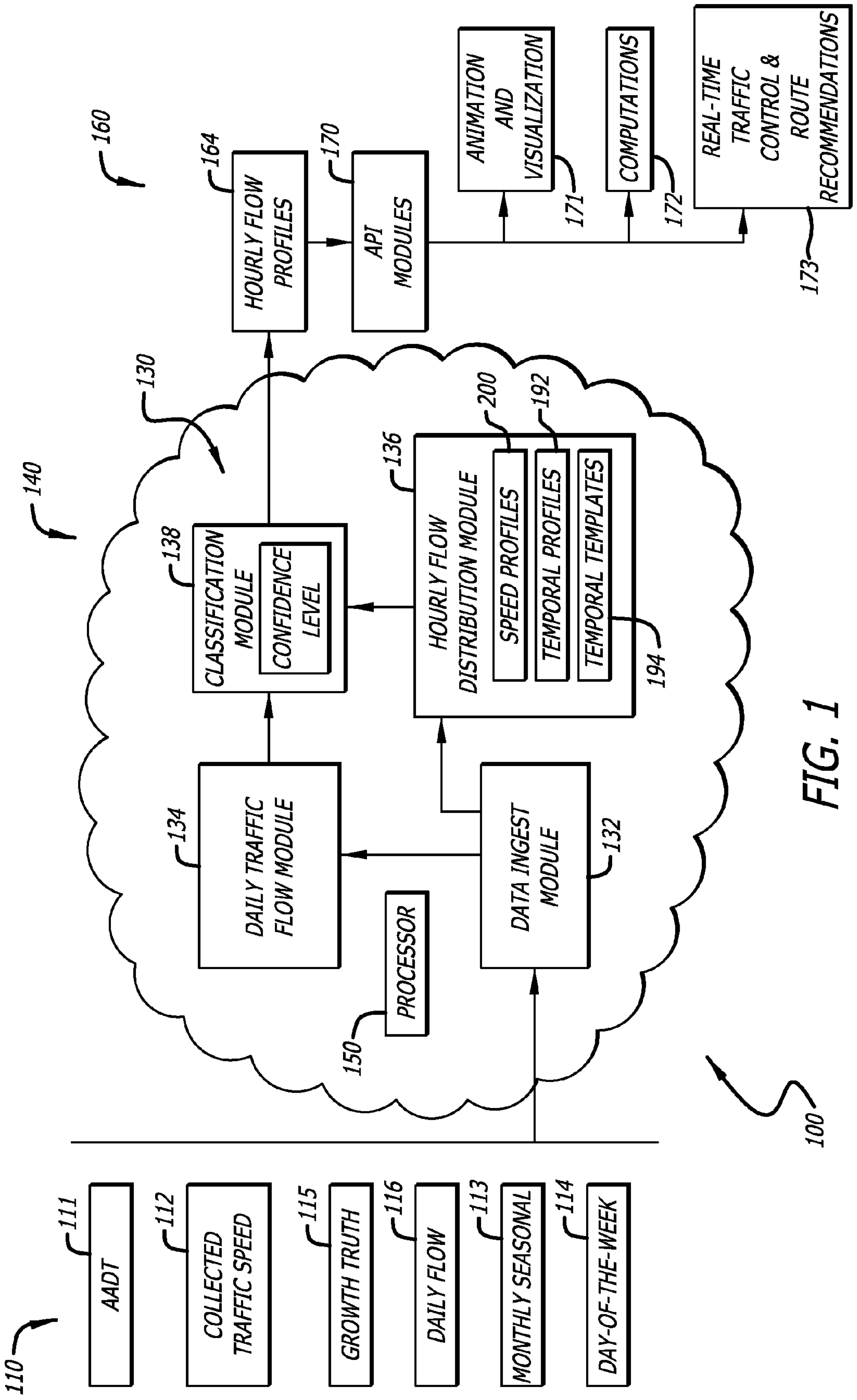
FIG. 1 is a block diagram of an hourly traffic flow profile development framework 100 of the present invention.

The present invention is a system and method of estimating directional hourly traffic flow profiles for a specified roadway link. FIG. 1 is a systemic block diagram showing an hourly traffic flow profile development framework 100 of the present invention that models annual average daily traffic data 111 and collected traffic speed data 112 in an approach that computes a daily directional traffic flow 180 for a given location, given direction and given date, determines an hourly flow distribution profile 190 for the same location, direction and day from collected traffic speed data 120, and calculates hourly traffic flow profiles 164 by multiplying the hourly flow distribution profile 190 by the daily directional traffic flow 180.

This approach accomplishes these functions by taking the annual average daily traffic value 111 for a given location and multiplying it by monthly seasonal factor 113. The resulting value is then multiplied by a day-of-week factor 114, and the result of this is then divided two to arrive at an estimate of the total daily volume in given direction for a given day, represented by the daily directional traffic flow 180. The hourly traffic flow profile development framework 100 then determines how this value is distributed over 24 hours of that day by applying temporal profiles 192 obtained by analyzing data from detectors that measure flow to group hourly distribution profiles 190 according to temporal templates 194. For each hourly distribution profiles 190 (morning peaks, afternoon peaks, double peaks, weekends, holidays), the hourly traffic flow profile development framework 100 normalizes by dividing the profile 190 (represented as a time series of flow values) by the sum of these values, averaging the hourly flow distribution profiles 190 by summing up all the temporal profiles 192 in the group and then dividing the sum by the number of profiles 192. Next, the present invention analyzes speed profiles 200 at the same location as annual average daily traffic value 110 was collected to determine which of the generic grouping the real hourly flow distribution belongs to. One of the hourly flow distribution profiles 190 is selected by analyzing how speed was changing during the day, and finally multiplied by the total daily directional traffic flow 180 computed earlier to produce an hourly flow profile 164.

These functions are performed in one or more data processing modules 130 within a computing environment 140 that includes one or more processors 150 in a plurality of software and hardware components that form at least a part of the hourly traffic flow profiles development framework 100. The one or more processors 150 are configured to execute program instructions in the one or more data processing modules 130 to perform the approach above. Also included is a data ingest module 132 configured to receive input data 110 from many different sources, also as further described herein, and one or more modules 170 configured to generate output data 160 for consumptive utility, also as further described herein.

The hourly traffic flow profile development framework 100 produces output data 160 representative of estimations 162 of hourly traffic flow profiles 164. These estimations 162 are distributed to one or more API (application programming interface) modules 170 for development of downstream uses of the output data 160, such as for example an animation and visualization module 171 that converts the output data 160 for use on a graphical user interface. Another module 170 performs computations 172 using the output data 160 that are vital to management of a transportation network infrastructure, such as for example computing roadway network throughput, computing delay in vehicle-hours imposed by a traffic condition, and a degree of roadway utilization as a measure of productivity. Still another module 170 may be configured to utilize output data 160 for generating real-time traffic control and route recommendations and other customized content 173 for web distribution, accessibility using applications on mobile devices, tablets, or personal computers, and broadcast media distribution.

As noted above, one function performed by the present invention is to compute a daily directional traffic flow 180 for a given location and direction of a roadway segment, and for given date. As noted above, average daily flows describing traffic volumes on a particular day do not provide enough information for traffic engineers and agencies to conduct sufficient performance evaluation and management of a transportation network, because traffic volume at any given location depends at least on the season, day of week, and whether or not the day is a holiday. In order to achieve a more accurate picture of traffic volumes, the present invention must therefore generate a daily directional traffic flow value 180 from the annual average daily traffic data 110 provided by governmental entities. Daily traffic volume at a given location is estimated by applying the following formula, in a daily traffic flow module 134:

$$\text{Daily Directional Flow} = \tfrac{1}{2} \times \text{Monthly Seasonal Factor} \times \text{Day Of Week Factor} \times \text{AADT}$$

The data ingest module 132 provides values for monthly seasonal factors 113 and day-of-the-week factors 114 for the function(s) performed by the daily traffic flow module 134. These values are obtained from publicly-available sources, such as the Federal Highway Administration of the United States Department of Transportation (such as from http://www.fhwa.dot.gov/policyinformation/travel_monitoring/tvt.cfm). For example, monthly figures for Vehicle Miles Traveled (VMT) are reported by individual states and collected and published by the FHWA. FIG. 3 is a graph showing an example of monthly seasonal factors 113 for the state of California in 2012 for traffic flows collected from a vehicle detector station for a fixed location.

Figure 4:
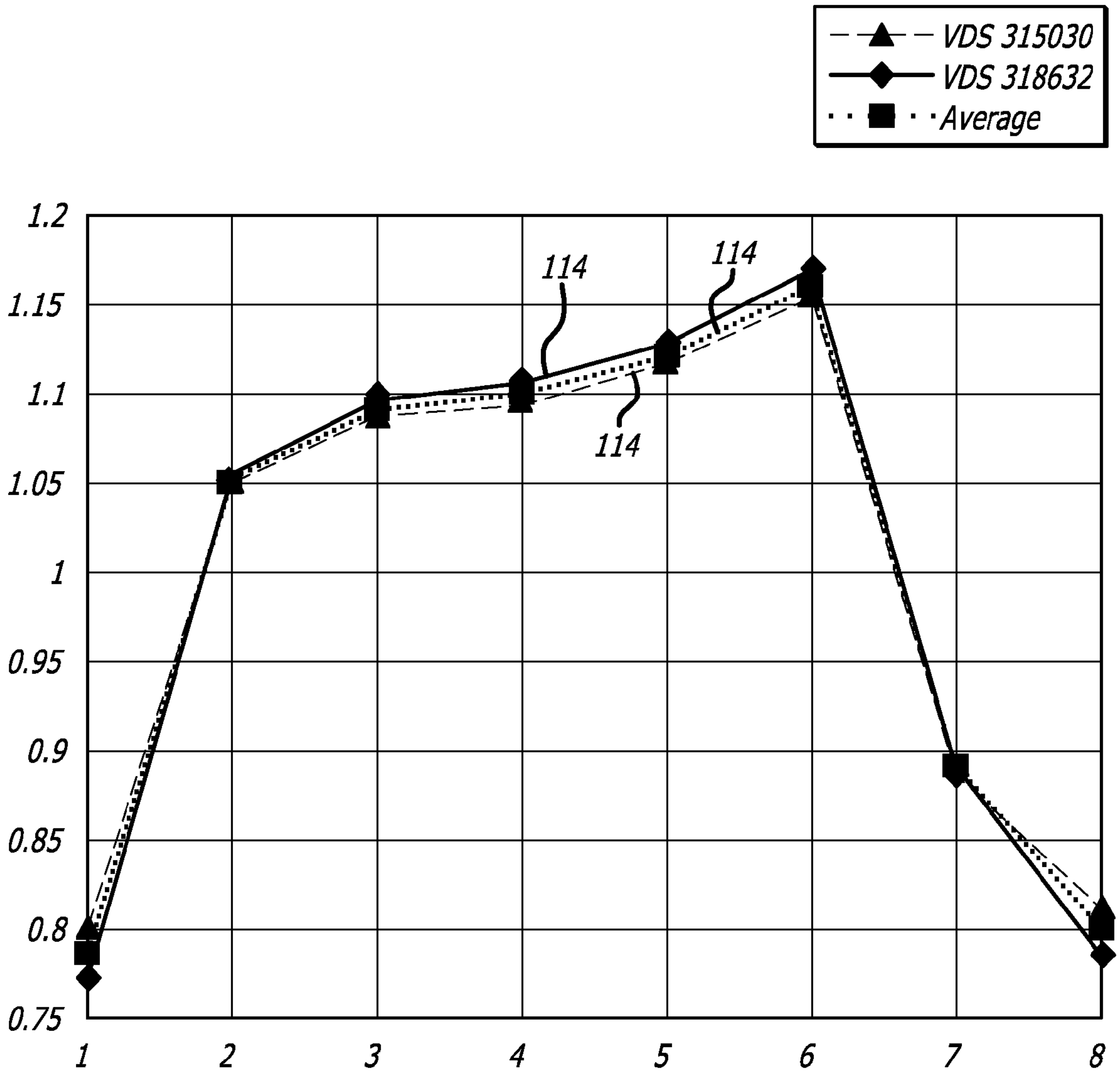
FIG. 4 is a graph showing an example of day-of-the-week factors obtained from a test location in California.

FIG. 4 is a graph showing an example of day-of-the-week factors 114 DOW factors obtained from a test location in California. Day-of-the-week (DOW) factors 114 are developed from data obtained for locations with existing detector measurements that can be considered representative of the overall traffic volume situation, using either privately-collected detector systems, measurements provided by state departments of transportation, or other portals, such as for example that provided at http://portal.its.pdx.edu (a traffic data source for Portland, Oreg.). The present invention processes such data to obtain the day-of-the-week factors 114 by finding locations for which acceptable daily flow measurements 116 have been detected. The present invention then collects daily flow measurements 116 for a year (or other significant period), and groups daily flows 116 by a day of week. The annual average daily traffic data 111, monthly seasonal factor 113, and day-of-the-week factor 114 values are then divided by a factor of two to normalize the daily directional traffic flow 180 resultant into an estimate for each direction of the roadway.

Another function performed in the present invention is to determine hourly flow distribution profiles 190, in an hourly flow distribution module 136 within the computing environment 140. It is generally the case that traffic flow patterns fall into five major temporal profile categories 192: morning peak, afternoon peak, double peak (morning and afternoon), and Saturday, and Sunday and/or holiday.

Figure 5:
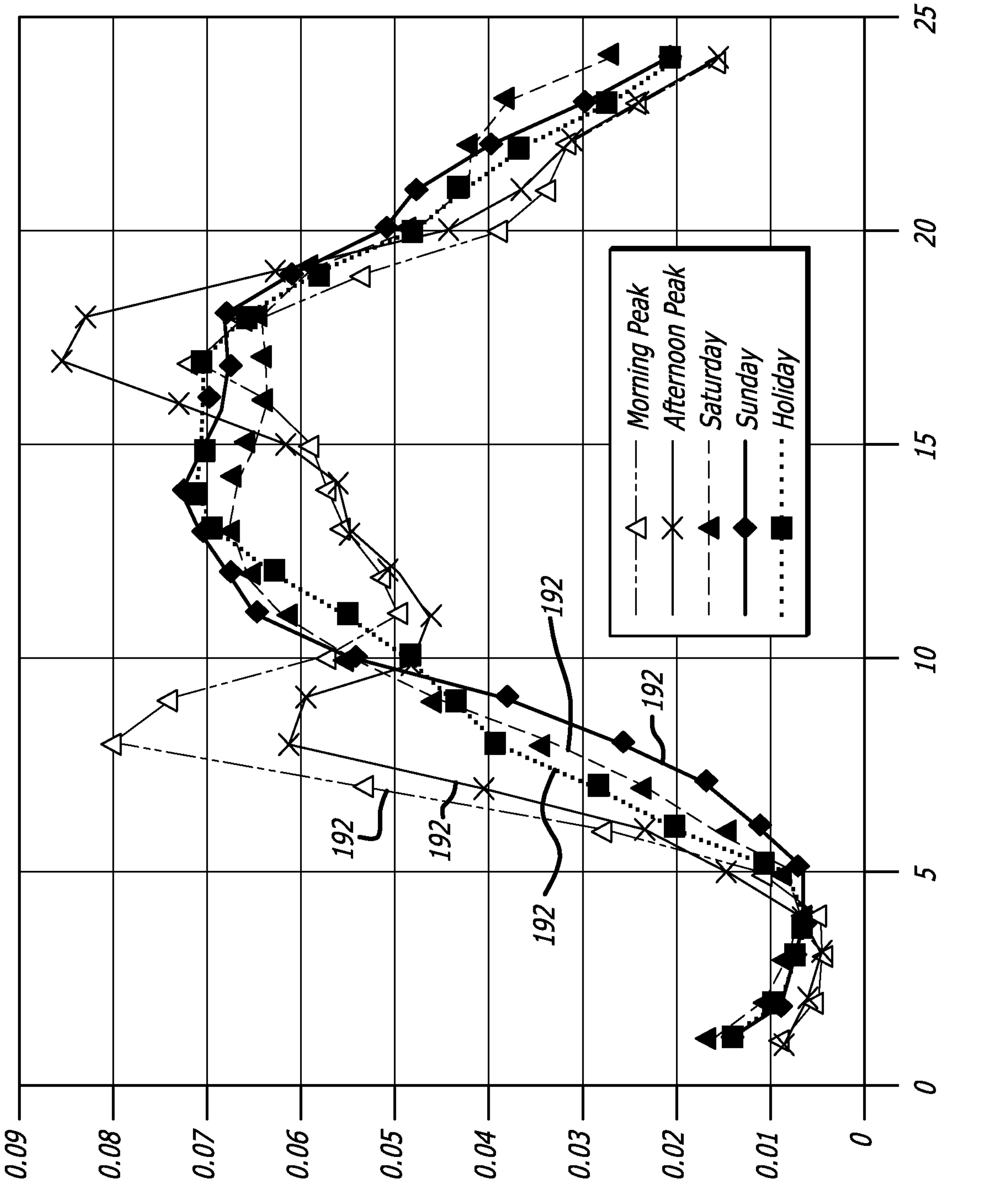
FIG. 5 is graph presenting sample temporal profiles categories for hourly flow distribution profiles according to one aspect of the present invention.

FIG. 5 is graph presenting sample temporal profiles categories 192. The double peak profile 192 is not shown in FIG. 5; instead, Sunday and holiday profiles 192 are shown as separate plots. Although it may be the case that Saturday, Sunday and holiday profiles 192 can be collapsed into one weekend profile 192, Saturday and Sunday are distinguished, because in general traffic patterns on these days differ.

For each of the categories from above, the hourly traffic flow profile development framework 100 of the present invention constructs templates 194 of hourly distribution profiles 190. This is accomplished by selecting locations with proper flow detection, grouping together traffic flow data falling into each category, and averaging those values over a significant, specified time period (such as for example one year). This generates five temporal templates 194 of hourly flow distribution profiles 190 for further use in estimating an hourly traffic flow profile 164.

Next, the hourly traffic flow profile development framework 100 develops a speed profile 200 from the collected traffic speed data 112 for the given location, direction and day to be analyzed. The speed profile 200 is a series of speed values with timestamps, so that for example an hourly speed profile for a particular day is a sequence of 24 speed values, each corresponding to its respective hour of the day. In real-time, speed measurements for a given link are provided every minute, and for each hour, the present invention takes the 60 speed values and average them to give an average speed for that hour. The present invention then compares the speed profile 200 with the hourly distribution profile 190, and assigns a temporal template 194 from the hourly distribution profiles 190 to this location, direction and day to further categorize the collected traffic speed data 112.

Figure 6:
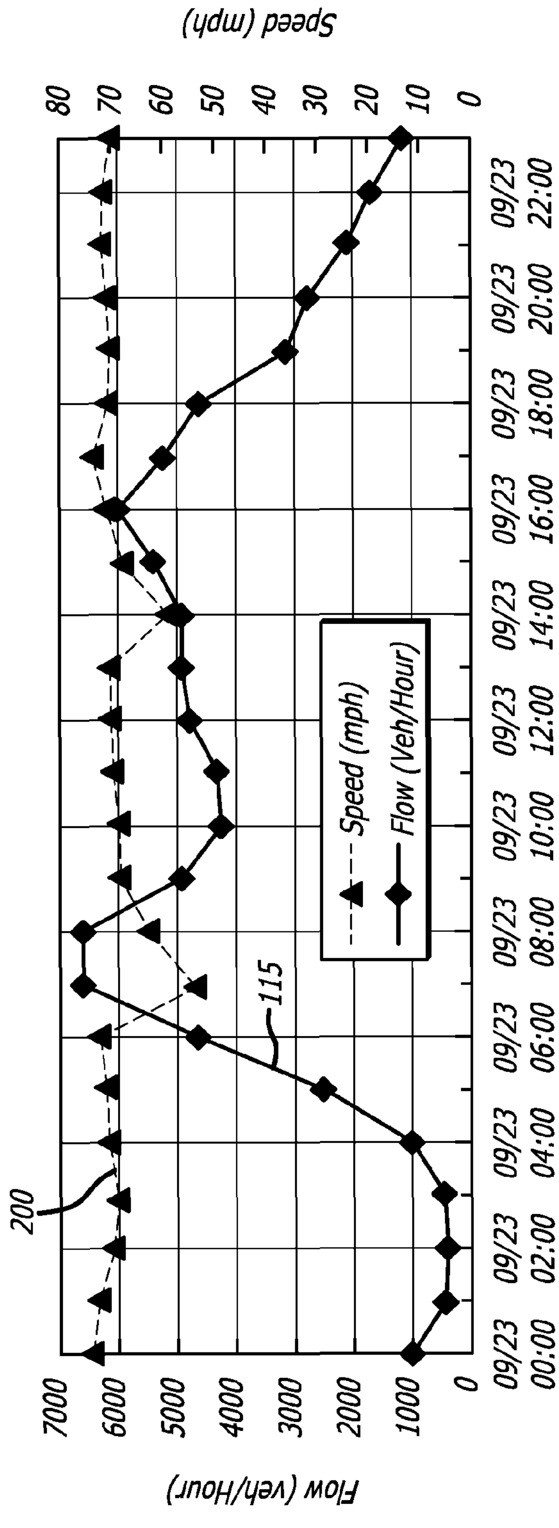
FIG. 6 is a graphical comparison of plots of a speed profile and actually measured traffic flow in ground truth.

The present invention then applies an assessment of ground truth 115 to compare the temporal template 192 assigned to the speed profile 200. FIG. 6 is a comparison of two graphical plots—one of a speed profile 200 for traffic speed reflected by collected traffic speed data 112, and actually measured traffic flow in ground truth 115. It is assumed that traffic speed drops the most in the period of the day when volume is the largest. Examining the period between 6:00 AM and 10:00 AM, the speed profile 200 in FIG. 6 indicates that this location, direction and day is classified as a morning peak, and assigned a temporal template 194 for an hourly distribution profile 190 for that time period. The ground truth 115, which is the actual flow measurement of traffic flow, agrees with the assessment of the speed profile 200.

The present invention then applies an algorithm to classify the computed daily directional traffic flows 180 (from analyzing annual average traffic data 111) and the hourly distribution profiles 190 (from analyzing the collected traffic speed data 112) in a classification module 138. The classification module 138 multiplies the hourly distribution profiles 190 with the daily directional traffic flows 180. Next, if the traffic speed profile 200 has been identified as a Saturday, Sunday or holiday, a corresponding hourly traffic flow profile 164 is assigned, and the classification module 138 terminates.

Otherwise, the hourly traffic flow profile development framework 100 of the present invention proceeds by determining an appropriate candidate template profile 194 for the free flow traffic speed 164 by looking at the average speed between 11 pm and 5 am. The present invention determines when a maximum speed drop occurs—between 5 am and 12 noon or after 12 pm. A maximum speed drop between 5 am to 12 noon makes the morning peak a candidate, and after 12 pm makes the afternoon peak a candidate. After determining the candidate template profile 194, the present invention checks, or compares, the traffic speed dynamics for an opposing period of the day (for morning peak candidate, afternoon speed is analyzed, and for the afternoon peak candidate—vice versa), and if there is also a speed drop that is 85% or above of the maximum speed drop, then a double peak template 194 is assigned as the hourly distribution profile 190. Otherwise, the present invention keeps the candidate template profile 194 as the final hourly traffic flow speed 164.

Figure 7:
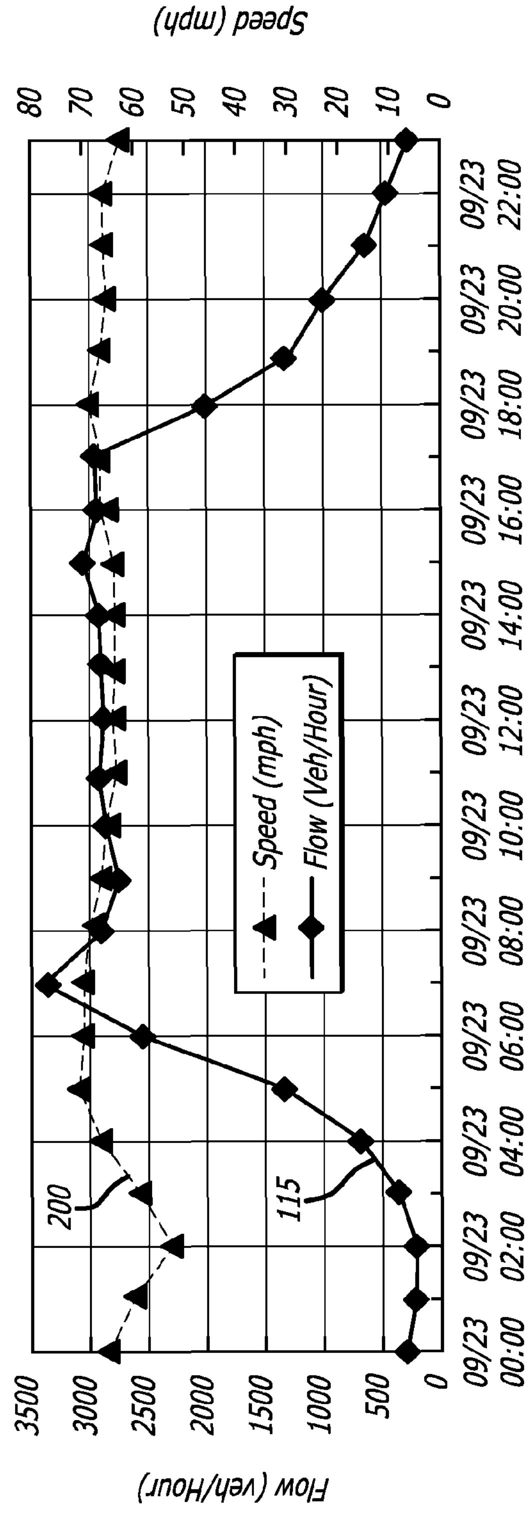
FIG. 7 is a graphical plot comparing actual free flow speed in a ground truth with a morning temporal period profile for an hourly flow distribution profile according to one aspect of the present invention.
Figure 8:
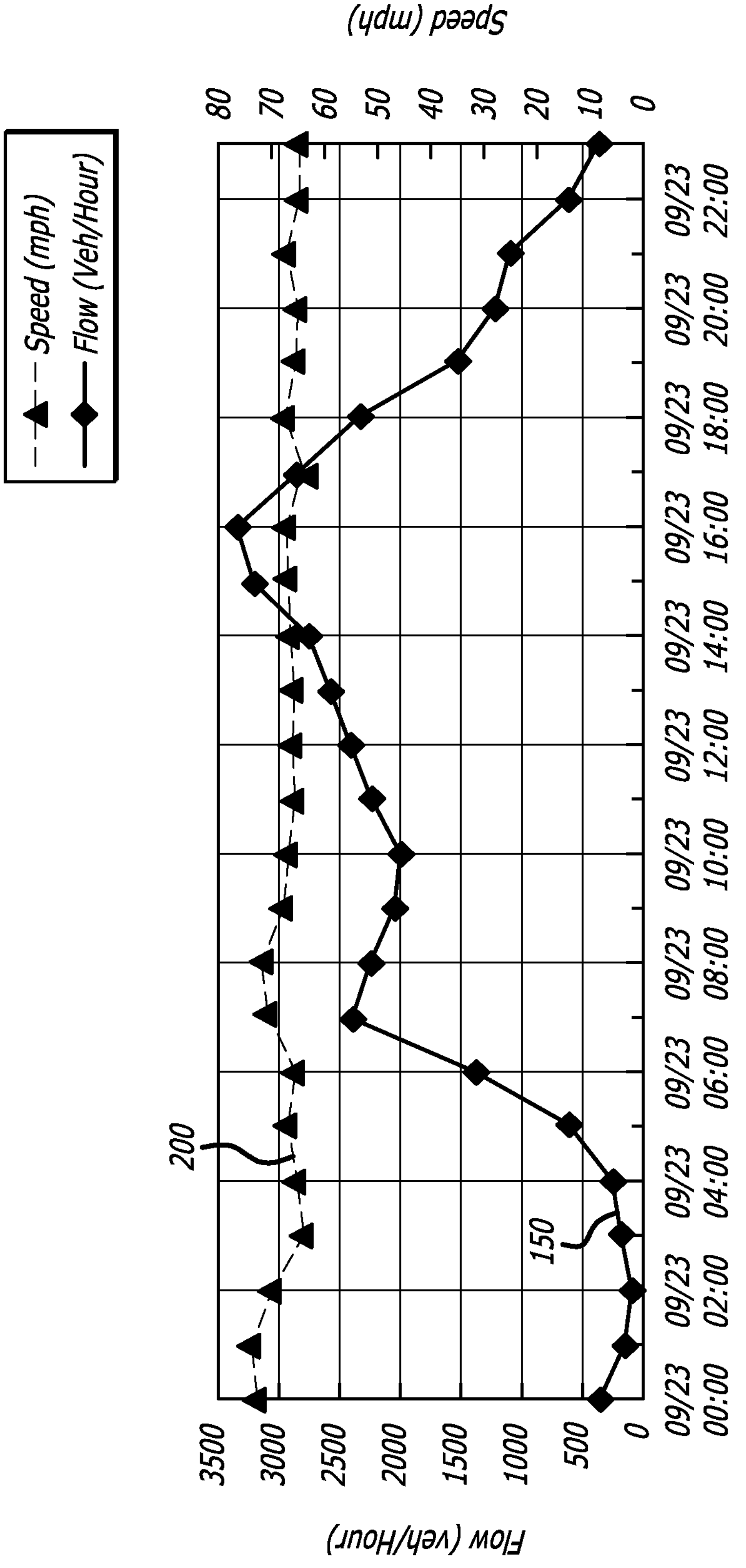
FIG. 8 is a graphical plot comparing actual free flow speed in a ground truth with an afternoon temporal period profile for an hourly flow distribution profile according to one aspect of the present invention.

It should be noted that it may not always be possible to infer anything from a traffic speed profile 200. The classical example is when speed always stays free flow. FIG. 7 and FIG. 8 are graphical plots demonstrating how similar, almost-constant speed profiles 200 flows can differ essentially. FIG. 7 is a graphical plot comparing actual free flow speed in a ground truth 115, and the morning temporal period profile 192 showing a peak flow for an hourly flow distribution profile 190. FIG. 8, meanwhile, is a graphical plot comparing actual free flow speed in a ground truth 115, and the afternoon temporal period profile 192 showing a peak flow for an hourly flow distribution profile 190.

The function performed by the classification module 138 therefore also tries to ensure that the temporal template 194 for the hourly flow distribution profile 190 has been correctly assigned. The classification module 138 proceeds by assigning a confidence level factor 210 when assigning templates 194 to hourly flow distribution profiles 190. For instance, in the case of traffic speed profiles 200 such as the ones shown in FIG. 7 and FIG. 8, the confidence level factor 210 is 0—in other words, the assigned template 194 for the hourly flow distribution profile 190 is a pure guess, whereas, the assignment of the morning peak profile 192 from the speed profile 200 in FIG. 6 may be assigned a much higher confidence level factor 210, for example 0.7.

For those assignments with confidence level factors 210 of 0, the present invention looks at the opposite direction of traffic flow, as well as at upstream and downstream neighboring links of the roadway. It is expected that the opposite direction would have a symmetrical profile (for example, if direction North exhibits morning peak, then direction South must have the afternoon peak and vice versa, and if North has the double peak, South must also have double peak). It is also expected that the upstream and downstream neighboring links should have the same template 194 as the location in question.

Where these opposing directions and/or neighboring roadway links have high confidence level factors 210 assigned to them and confirm the assignment of the correct temporal template 194 for the hourly distribution profile 190 for the location in question, it is the case that hourly flow distribution profiles 190 assigned with high confidence level factors 210 can be smeared to their upstream and downstream neighboring links with 0 confidence level factors 210, and be used to infer an hourly flow distribution profile 190 for the opposite direction at the same location.

The methodology described herein for estimating hourly traffic flows 164 may be tested at places where a "ground truth" 115 is available, such as where there is known freeway data. At such places, the hourly traffic flow profile development framework 100 selects all healthy detectors (for example, those detector stations providing observability above 80%) and retrieves traffic flow data 116. The present invention then constructs daily directional traffic flows 180 and hourly flow distribution profiles 190 respectively from annual average daily traffic values 111 and collected traffic speed data 112 as described above, and compares those with the ground truth 115 to determine an amount of error.

The hourly traffic flow profile development framework 100 may therefore include, in a further embodiment, one or more protocols to overcome errors in the modeling described above. The present invention contemplates that errors have three components. One component is the seasonal monthly factor, and a second of which is the day-of-the-week factor, both of which are quantitative. The distribution template is the third component, and this is qualitative. Our current research is aimed at reducing this component.

For the quantitative components, any error in the monthly seasonal and day-of-week factors are minimized by computing these factors by geographical area to introduce more accuracy than, for example, simple utilization of nation-wide factors. In a first step of refinement, the present invention computes these factors by state, and then in further steps of refinement by more localized geographical limitations such as county, region, city, town, etc. Regarding the qualitative component of flow distribution classification in the distribution template, the hourly traffic flow profile development framework 100 proceeds as noted above by assigning confidence level factors 210 to hourly flow distribution profiles and comparing with either upstream and downstream neighboring links (in the same direction of travel) or with the opposite direction of travel at the same location to draw inferences about the amount of error.

The systems and methods of the present invention may be implemented in many different computing environments 140. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A method of estimating an hourly traffic flow profile for a roadway segment, comprising:

- computing a daily traffic flow value at a location on a roadway segment, and for a specified direction at a specified date, from annual average daily traffic data;
- determining an hourly flow distribution profile for the location and for the specified direction at the specified date from collected traffic speed data, by 1) constructing temporal templates to detected traffic flows values, 2) developing one or more speed profiles from the collected traffic speed data, and 3) assigning a temporal template to a speed profile; and
- calculating hourly traffic flow profiles by multiplying the hourly flow distribution profile by the daily flow value.

2. The method of claim 1, wherein the computing a daily traffic flow value at a location on a roadway segment further comprises applying a monthly seasonal factor obtained from published traffic volume trends.

3. The method of claim 1, wherein the computing a daily traffic flow value at a location on a roadway segment further comprises applying a day of the week factor, the day of the week factor obtained by finding locations with existing detector measurements representative of an overall traffic volume situation, collecting daily flows for a specified time period, and grouping daily flows by a day of week.

4. The method of claim 1, wherein the determining an hourly flow distribution profile further comprises selecting locations of the roadway segment with proper flow detection, grouping together data falling into a plurality of time periods, and averaging those values over a selected time period to construct the temporal templates, wherein the plurality of time periods includes a morning peak, an afternoon peak, a Saturday period, a Sunday period, and a double peak.

5. The method of claim 4, wherein the determining an hourly flow distribution profile further comprises comparing the temporal templates assigned to a location, direction and day in a speed profile with ground truth data representative of an actual flow measurement.

6. The method of claim 1, further comprising identifying a candidate temporal template for a free flow traffic speed estimation by determining a time period when a maximum speed drop occurs.

7. The method of claim 6, further comprising comparing traffic speed data for an opposing time period, wherein a speed drop that is 85% or higher of the maximum speed drop results in a double peak time period assigned as the temporal template hourly distribution profile.

8. The method of claim 1, further comprising assigning a confidence level to each speed profile assigned with a temporal template.

9. The method of claim 8, further comprising examining an opposite direction of traffic flow at the location and one or more neighboring links of roadway segments where the assigned confidence level is zero, wherein where the opposite direction of traffic flow at the location and one or more neighboring links of roadway segments have high confidence levels assigned and confirm an assignment of a correct distribution profile template for the location, the hourly flow distribution profiles assigned with high confidence are smeared to the neighboring links with an assigned confidence level of zero, and infer the hourly flow distribution profile for the opposite direction at the location.

10. A system comprising:

- a computer-readable storage medium operably coupled to at least one computer processor and having program instructions stored therein, the computer processor being operable to execute the program instructions to perform one or more data processing functions in a plurality of modules, the plurality of modules including:
- a data ingest module configured to ingest input data that at least includes annual average daily traffic data, detected traffic flow values, and collected traffic speed data,
- a daily traffic flow module configured to normalize the annual average traffic data with a monthly seasonal factor and a day of the week factor for each location on a roadway segment, for a specified direction and a specified date to formulate a daily traffic flow value,
- an hourly flow distribution profile module configured to assign temporal templates developed from detected traffic flow values to speed profiles representative of collected traffic speed data to determine an hourly flow distribution profile for each location, for the specified direction at the specified date, and
- a classification module configured to categorize the average annual daily traffic data with the collected traffic speed data to allocate the average annual daily traffic data into a time period that includes a morning peak, an afternoon peak, a Saturday period, a Sunday period, and a double peak, by multiplying the hourly flow distribution profile by the daily traffic flow value.

11. The system of claim 10, wherein the monthly seasonal factor is obtained from published traffic volume trends, and the day of the week factor is obtained from locations with existing detector measurements representative of an overall traffic volume situation, for which daily flows are collected for a specified time period and grouped by a day of week.

12. The system of claim 10, wherein the hourly flow distribution profile module is further configured to select locations of the roadway segment with proper flow detection, group together data falling into a plurality of time periods, and average those values over a selected time period to construct the temporal templates.

13. The system of claim 10, wherein the hourly flow distribution profile module is further configured to compare the temporal templates assigned to a location, direction and day in a speed profile with ground truth data representative of an actual flow measurement.

14. The system of claim 10, wherein the classification module is further configured to identify a candidate temporal template for a free flow traffic speed estimation by determining a time period when a maximum speed drop occurs.

15. The system of claim 14, wherein the classification module is further configured to compare traffic speed data for an opposing time period, wherein a speed drop that is 85% or higher of the maximum speed drop results in a double peak time period assigned as the temporal template hourly distribution profile.

16. The system of claim 10, wherein the classification module is further configured to assign a confidence level to each speed profile assigned with a temporal template and examine an opposite direction of traffic flow at the location and one or more neighboring links of roadway segments where the assigned confidence level is zero, so that where the opposite direction of traffic flow at the location and one or more neighboring links of roadway segments have high confidence levels assigned and confirm an assignment of a correct distribution profile template for the location, the hourly flow distribution profiles assigned with high confidence are smeared to the neighboring links with an assigned confidence level of zero to infer the hourly flow distribution profile for the opposite direction at the location.

17. A method comprising:

ingesting input data that at least includes annual average daily traffic data, detected traffic flow values, and collected traffic speed data;

modeling the input data to construct estimates of hourly traffic flow profiles, by:

normalizing the annual average traffic data with a monthly seasonal factor and a day of the week factor for each location on a roadway segment, for a specified direction and a specified date to formulate a daily traffic flow value, assigning temporal templates constructed from detected traffic flow values to speed profiles representative of collected traffic speed data to determine an hourly flow distribution profile for each location, for the specified direction at the specified date, and categorizing the average annual daily traffic data with the collected traffic speed data to allocate the average annual daily traffic data into a time period that includes a morning peak, an afternoon peak, a Saturday period, a Sunday period, and a double peak; and generating output data representative of estimations of hourly traffic flow profiles.

18. The method of claim 17, wherein the normalizing the average annual traffic data further comprising developing the monthly seasonal factor from published traffic volume trends, and developing the day of the week factor from locations with existing detector measurements representative of an overall traffic volume situation, for which daily flows are collected for a specified time period and grouped by a day of week.

19. The method of claim 17, wherein the assigning temporal templates further comprises selecting locations of the roadway segment with proper flow detection, grouping together data falling into a plurality of time periods, and averaging those values over a selected time period to construct the temporal templates.

20. The method of claim 19, wherein the assigning temporal templates further comprises comparing the temporal templates assigned to a location, direction and day in a speed profile with ground truth data representative of an actual flow measurement.

21. The method of claim 17, wherein the modeling the input data to construct estimates of hourly traffic flow profiles further comprises identifying a candidate temporal template for a free flow traffic speed estimation by determining a time period when a maximum speed drop occurs.

22. The method of claim 21, wherein the modeling the input data to construct estimates of hourly traffic flow profiles further comprises comparing traffic speed data for an opposing time period, wherein a speed drop that is 85% or higher of the maximum speed drop results in a double peak time period assigned as the temporal template hourly distribution profile.

23. The method of claim 17, wherein the modeling the input data to construct estimates of hourly traffic flow profiles further comprises assigning a confidence level to each speed profile assigned with a temporal template.

24. The method of claim 23, wherein the modeling the input data to construct estimates of hourly traffic flow profiles further comprises examining an opposite direction of traffic flow at the location and one or more neighboring links of roadway segments where the assigned confidence level is zero, wherein where the opposite direction of traffic flow at the location and one or more neighboring links of roadway segments have high confidence levels assigned and confirm an assignment of a correct distribution profile template for the location, the hourly flow distribution profiles assigned with high confidence are smeared to the neighboring links with an assigned confidence level of zero, and infer the hourly flow distribution profile for the opposite direction at the location.

25. The method of claim 23, wherein the generating output data representative of estimations of hourly traffic flow profiles further comprises generating animated content for visualization of the output data on a graphical user interface.

26. The method of claim 23, wherein the generating output data representative of estimations of hourly traffic flow profiles further comprises computing at least one of roadway network throughput, delay in vehicle-hours imposed by a traffic condition, and a degree of roadway utilization as a measure of productivity.

27. The method of claim 23, wherein the generating output data representative of estimations of hourly traffic flow profiles further comprises generating real-time traffic control and route recommendations for content distribution to one or more of web-based applications, mobile-specific applications, and broadcast media.

* * * * *